United States Patent Office 3,017,434
Patented Jan. 16, 1962

3,017,434
ISOLATION OF FATTY ACIDS FROM AQUEOUS SOLUTIONS THEREOF
Jack J. Bulloff, Dayton, Ohio, assignor to The Commonwealth Engineering Company of Ohio, Dayton, Ohio, a corporation of Ohio
No Drawing. Original application Oct. 5, 1955, Ser. No. 538,764. Divided and this application July 24, 1958, Ser. No. 754,508
2 Claims. (Cl. 260—526)

This invention relates to improved methods for isolating fatty acids from aqueous or aqueous alkaline solutions thereof, or for separating such acids in admixture with dicarboxylic acids, as a means for obtaining both types of acid in pure form. This application is a division of my application Ser. No. 538,764, now abandoned.

There are any number of instances where it is desirable to isolate fatty acids from product process or synthesis solutions, or to separate the fatty acids from dicarboxylic acids also occuring in the solutions, the object being to obtain both of the acid types in pure form.

For example, it is often desirable to isolate fatty acids or soluble salts thereof from crude products containing them and resulting from such large scale industrial processes as the saponification or hydrolysis of fats, oils, waxes or natural esters, or from oxidation of product solutions in the Oxo process.

It is also desirable to isolate fatty acids from crude products resulting from the hot air oxidation of waxes, oils and gases either as found naturally in petroleum or resulting from petroleum methods, as well as from crude products produced by the oxidation or oxidative splitting of unsaturated and cyclic hydrocarbons from coal, petroleum and various other large scale synthetic industrial chemical operations.

In general, it is desirable to have available a simple, reliable method for isolating individual or mixed fatty acids contained in aqueous solutions obtained by procedures utilizing pure compounds or mixtures.

The compounds or mixtures comprising the fatty acids to be isolated may be hydrolysis products of, for instance, nitrides, amides, esters, acyl halides, anhydrides, trihalides, diazoketones and hydantoins. Or they may be oxidation products of primary alcohols, aldehydes, ketones, quinones, olefinic compounds, tertiary alcohols or certain acetylic derivatives, or the products resulting from ozonization or ozonolysis of olefinic or acetylenic derivatives.

In addition to the mentioned methods resulting in aqueous solutions containing fatty acids to be isolated, there are special methods which yield solutions of the fatty acids.

Such special methods include the oxidation of alkyl-substituted aryl derivatives, of 5-alkyl-2-fuoric acids, and of certain other cyclic alcohols, aldehydes and ketones, the oxidation and decarboxylation of alpha-keto acids, the halogenation of methyl ketones, the dismutation of aldehydes, carbonation of organo-metallic compounds, carboxylation of aromatic nuclei, hydrolysis and decarboxylation of alpha-cyano acids, hydroxy acids, keto acids, aromatic acids and dioxolanes, the alkali fusion of unsaturated acids, hydrolysis and decarboxylation of acylamino-malonic acids, and, also, the alkaline cleavage of beta-ketoalkylpyridinium iodides.

End products containing fatty acids to be isolated are obtained when nitriles are subjected to alkaline hydrolysis.

Nitriles may be subjected to alkaline hydrolysis using a strong base such as sodium hydroxide, potassium hydroxide, or a tetralkyl ammonium hydroxide, or to acid hydrolysis using a mineral acid such as sulfuric or phosphoric acid. Among the available methods for preparing these nitriles in solution which may be hydrolyzed to produce fatty acids may be mentioned:

(1) Action of alkali cyanides on organic halides
(2) Action of alkali cyanides on sulfonate salts
(3) Action of cuprous cyanide on diazonium compounds
(4) Action of cyanogenating agents on phenols
(5) Dehydration of oximes
(6) Alkylation of cyano-compounds
(7) Decarboxylation of cyano acids
(8) Addition of hydrogen cyanide to unsaturated compounds
(9) Cyano amination of carbonyl compounds These are all standard methods resulting in solutions of nitriles which, on hydrolysis, yield straight chain or branched soluble fatty acids having a carbon content >3 in the case of straight chain acids and >4 in the case of branched chain acids.

Hydrolysis of amides also yields fatty acids in solution which it may be desired to isolate. Weaker acids such as acetic acid may be used to effect the hydrolysis. A special instance is the use of nitrous acid where the reaction is driven to completion by evolution of nitrogen. Important methods resulting in soluble fatty acids it may be desirable to isolate from solution include:

(1) Action of acylating agents such as acyl halides, carboxylic acids, and their anhydrides, esters and the like, on ammonia or primary, secondary or tertiary non-ring organic amines
(2) Action of acidolytic agents on amides
(3) Partial hydrolysis of nitriles
(4) Ketenation of amines
(5) Action of carbon suboxide on amines
(6) Grignardization of isocyanides
(7) Rearrangement of oximes
(8) Ammonolysis of diazoketones
(9) Amination of lactones
(10) Rearrangement of nitroparaffines Esters may be hydrolyzed with relatively weak hydrolytic agents. In some cases hot water, aqueous alcoholic carbonates, or solutions or suspensions of alkaline earth hydroxides are useful. While some of the methods involve the use of a fatty acid in the preparation of the ester, they are not redundant since the synthesis may have been performed by-product-wise without intermediate isolation. Among the specific methods which may be mentioned are the following:

(1) Direct esterifications of acids with alcohols
(2) Esterification of alcohols with acyl halides or anhydrides
(3) Ketenation of alcohols or phenols
(4) Phosgenolysis of hydroxy derivatives
(5) Ester exchange
(6) Electrolysis of esters
(7) Oxidation of aldehydes or ketones
(8) Cleavage of keto-esters or lactones
(9) Reduction of keto-esters
(10) Reduction of unsaturated esters Acyl halides may be hydrolyzed in a very simple manner. In most cases, cold water effects the hydrolysis, and in other cases dilute weak acids or alkalis are satisfactory. The most common preparations of acyl halides utilize carboxylic acids, esters, or salts and inorgnaic acid halides of the group V or VI elements. Other methods include:

(1) Halogenation of aldehydes
(2) Acyl halide interchange with other carboxylic acids In this method, the halide formed may be the desired product and recovery of the released fatty acid may constitute an improvement in by-product separation.

Similar procedures apply to the hydrolysis and preparation of anhydrides. One method that may be of economic significance is the reaction of cyclic olefinic anhydrides with dienes such as cyclopentadiene.

The hydrolysis of primary nitro-compounds obtained by direct nitration of natural hydrocarbons or hydrocarbons derived from natural products results in solutions containing fatty acids which it may be desired to isolate. As an example, a standard hydrolytic procedure comprises heating the nitro paraffins at 120–140° C. for eight hours with 85% sulfuric acid. Important methods of preparing primary nitro-compounds include:

(1) Vapor phase nitration of hydrocarbons
(2) Reaction of primary alkyl halides with silver nitrate
(3) Decarboxylation of nitro-acids
(4) Reaction of alpha-bromo-acids and alkali nitrites
(5) Action of nitryl chloride on unsaturated organic halides
(6) Addition of alpha-nitro-olefins to other nitro paraffins The oxidative procedures may be carried out in a variety of ways. Acid chromate solutions, acid and alkaline permanganate solutions, nitric acid, oxidant solutions in acetic acid or anhydride may be used.

Primary alcohols may be prepared by a large number of methods of which the following are illustrative:

(1) Reduction of aldehydes
(2) Reaction of carbonyl compounds with metal alkoxides
(3) Reduction of unsaturated or aromatic hydroxy compounds
(4) Action of organo-metallic compounds on aldehydes or of oxidant organo-metallic compounds on alkyl halides, or of organo-metallic compounds on ketones, oxides, or epoxides, or esters
(5) The hydrolysis of esters or halides
(6) The cleavage of ethers or oxides
(7) The condensation of aldehydes, ketones, halogenated compounds, or of carbonyl compounds of other types
(8) The oxidation of olefines, acetylenes or other ethines
(9) Hydrolysis of alpha-diazo ketones
(10) Reduction of esters Commonly used and commercially important methods of preparing aldehydes include:

(1) Action of formylating agents on aromatic hydrocarbons, cyano-compounds, phenols, and ketones
(2) Cleavage of Schiff bases
(3) Hydrolysis of gem-dihalides, alkoxydihydropyrans, oximes, hydrazones, semicarbazones, aminebisulfite- aldehydes and acetals
(4) Oxidation of aromatic side-chains
(5) Oxidation of olefins or methyl ketones
(6) Reaction of primary alcohols with oxidants of dehydrogenating agents
(7) Reduction of olefinic aldehydes, acyl halides, thio, or organic nitrites
(8) Reaction of Grignard reagents with orthoformic esters of ethoxymethyleneaniline
(9) Formylation of metal acetylides
(10) Decarboxylation of glycidic or alpha-keto acids.

Ketones may be prepared by the following methods:

(1) Acylation of hydrocarbons
(2) Oxidation of secondary alcohols, or dehydrogenation thereof
(3) Ketone-alcohol oxidation-reduction exchange
(4) Ozonolysis of olefine compounds
(5) Oxidation of methylene compounds
(6) Decarboxylation of acylmalonic acids
(7) Grignardization or analogous organo-metallic treatment of nitriles, anhydrides, acyl halides, amides, alpha, beta-olefinic ketones, esters and carboxylic salts
(8) Reduction of alpha, beta-olefinic ketones or of phenols
(9) Cyclization of lactones
(10) Cleavage of substituted ring compounds Quinones may be prepared by the oxidation of aromatic hydrocarbons, phenols, aminophenols, aryldiamines, and hydroxynaphthoquinones. Quinones may be alkylated to other quinones. Ortho-aroylbenzoic acids may be quinonized by use of ring-closing agents. Finally, all of these quinones may be converted to other quinones by use of the very same diene reagents such as the cyclopentadiene already referred to herein.

Olefinic compounds may be reacted directly with ozone, and then cleaved with silver oxide to acids. Some of the product acids may be partly decarboxylated yielding products containing fewer carbonyl groups. Some methods for preparing olefins are the following:

(1) Dehydration of hydroxy compounds
(2) Dehalogenation of dihalides or dehalogenation of monohalides
(3) Dealkanolation of ethers or acetals
(4) Pyrolysis of esters, methyl xanthates, amines, or organic aluminum base salts
(5) Reaction of olefinic acids with decarboxylating or diazotizing agents
(6) Reaction of halogen compounds and active organo-metallic agents
(7) Reduction of ethynic compounds
(8) Isomerization of olefinic compounds
(9) Condensation of thiocarbonyl compounds, halides, beta-hydroxy compounds, methylene compounds, aromatic aldehydes, anhydrides, carboxylic salts, and alpha-ketolactones
(10) The conjugate addition of dienes to compounds containing an unsaturated chemical bond or an affinitive electronic configuration All of the methods mentioned are, as will be understood by those skilled in the art, methods which result in aqueous solutions of the soluble fatty acids.

Heretofore, there has not been available a convenient and economical method for separating the soluble fatty acids (or alkylated fatty acid) from the solutions.

One object of the present invention is to provide a simple, relatively inexpensive method for isolating the fatty acids or alkylated fatty acids from the dilute aqueous solutions and to separate them from dicarboxylic acids that may be contained in the solution.

Another object of the invention is to provide a method for treating aqueous solutions of mixed mono-carboxylic and di-carboxylic acids to remove the former and leave the latter, substantially free from the monocarboxylic acid, in the solution.

These and other objects of the invention are achieved by converting the fatty acid to the corresponding insoluble aluminum soap which precipitates and may be separated from the solution by filtration, and, optionally, treating the aluminum soap with acid to liberate the free fatty acid therefrom.

The aluminum soap of the fatty acid is formed by mixing the aqueous solution containing the fatty acid with an aqueous solution of a water-soluble aluminum salt.

The aqueous solution containing the fatty acid to be isolated may be alkaline or it may be saponified or made alkaline prior to mixing thereof with the aluminum salt solution. The solution of the fatty acid is not necessarily saponified or made alkaline before mixing with the aluminum salt solution.

Other conditions may be used. Thus, the aluminum salt solution can be added to an acidic fatty acid solution and precipitation of the aluminum soap effected by adding alkali to the mixture until the pH is increased to 5.0 to 7.0. Or the aluminum salt solution can be added to a saponified fatty acid solution, rather than vice versa, which order of addition results in a mixture of the two aqueous solutions usually having a pH of 5.0 to 6.0.

The usual procedure is to add the saponified aqueous solution containing the monocarboxylic acid or mixed mono- and di-carboxylic acids to the aqueous solution of aluminum salt. However, as noted, this procedure may be reversed. In any event, the pH of the aqueous medium consisting of the mixed solutions at which the insoluble aluminum soap precipitates is usually between 5.0–7.0.

The aluminum salts of the fatty acids HR are monohydroxy soaps of the type $AlOHR_2$ (where HR is $C_nH_{2n}O_2$ and R is $C_nH_{2n-1}O_2$) which are very insoluble in water at pH 4 to 9.

The addition of mineral acid to the washed precipitate comprising the soap of the monocarboxylic acid liberates the acid. Dicarboxylic acids which may be present in the aqueous solution along with the monocarboxylic acid form readily hydrolyzable salts which are not precipitated with the aluminum soap of the monocarboxylic acid. Thus, when a solution comprising mono- and di-carboxylic acids (or the alkylated acids) is made alkaline and added to an excess (about 5–30% over the stoichiometric quantity) of an aqueous solution of an aluminum salt such as aluminum sulfate, the aluminum soap of the monocarboxylic acid is precipitated selectively and recovered from the solution, the dicarboxylic or alkylated dicarboxylic acid being contained in the supernatant.

The procedure outlined is operable for the selective isolation of the soluble monocarboxylic acid (or their alkylated derivatives) from the crude products obtained by any of the processes described herein, as well as from solutions of naturally occurring acids, acid distillates or any other aqueous source of the free organic acids.

One specific source of the monocarboxylic acid (or alkylated acid) is the aqueous solution obtained by oxidizing cyclopentadiene or alkyl derivatives thereof as described in my pending application Serial No. 459,840, filed October 1, 1954, now abandoned.

Briefly, the method described in that application involves oxidizing cyclopentadiene or the alkyl derivative thereof in aqueous acid solution or slurry by means of an appropriate oxidizing agent such as barium or potassium permanganates, perrhenates, chromates, ferrates or periodates. Aqueous nitric acid may also be used.

The oxidation product is an aqueous solution of malonic acid or alkylated malonic acid. On heating the solution, the malonic acid is decarboxylated to acetic acid, or in the case of alkyl malonic acid, to the corresponding alkyl acetic acid.

The reactions involved may be illustrated as follows:

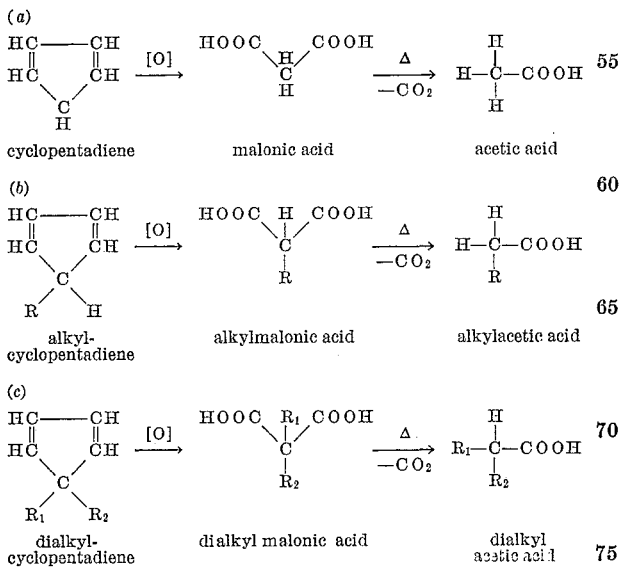

While process (c) is operable, the introduction of a second alkyl group into monoalkyl sodium cyclopentadienyl by reacting the latter with an alkyl halide does not give high yields.

It is found that branched chain acids are more easily obtained, these being the products of decarboxylation of the oxidation product, dialkyl malonic acid in which the alkyl radicals are branched. The oxidation of the dialkyl cyclopentadiene in which the alkyl radicals are branched, decarboxylation of the dialkyl malonic acid to the corresponding dialkyl monocarboxylic acid, and isolation of the latter from the solution as the aluminum soap are illustrated in the following examples:

*Example I*

Dicyclopentadiene containing an anti-oxidant was depolymerized by boiling. The vapors were led over a bed of powdered sodium hydride. Cyclopentadienyl sodium was formed in the bed, with evolution of hydrogen. Effluent gases were led through a cold trap to remove unreacted cyclopentadiene as liquid which was saved for recycling. About 95% of the sodium hydride was converted to sodium cyclopentadienyl. t-Butyl chloride was vaporized into the reaction chamber. Some isobutane initially evolved escaped from a trap provided for it. The trap contained some liquid product; the reaction chamber was swept with a pump while heated and the rest of the product was thus passed into the cold trap. To prevent contamination of the product with t-butyl chloride, only 75 gms. (about 5 gms. less than the stoichiometric amount) thereof was vaporized originally. Some sodium cyclopentadienyl remained unreacted on the bed. The cut-off trap was removed and found to contain 110 gms. of quite pure t-butylcyclopentadiene; (yield based on t-butylchloride, about 97%).

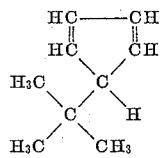

The t-butylcyclopentadiene was distilled into an excess of acid permanganate solution, with stirring. When the oxidation was complete, excess permanganate was reduced by passing sulfur dioxide gas into the solution. The solution was then made alkaline by addition of a solution of sodium hydroxide. Hydrogen sulfide was then passed in. A precipitate of sulfur and manganese sulfide formed. The solution was filtered. The filtrate contained alkali sulfates and disodium t-butylmalonate:

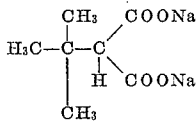

The filtrate was acidified and boiled until carbon dioxide evolution ceased. It was then made alkaline and poured into an excess of aluminum sulfate solution. Aluminum monohydroxy-bis-3,3-dimethylbutan-1-oic salt precipitated. It was separated from the supernatant, washed, dried in a draft oven at 60° C., powdered, added to concentrated hydrochloric acid and supernatant phase of 3,3-dimethylbutanoic acid

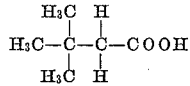

was separated in a 70% yield.

*Example II*

About 75 gms. of sec-butyl chloride were passed over a bed containing about 88 gms. of sodium cyclopentadienyl. The effluent vapors, which contained some butane, were led through 30% aqueous nitric acid. The nitric acid solution was neutralized, and heated at 55° C. for one hour. It was cooled and passed into an excess of alum solution. The aluminum soap precipitated was washed and added wet to 1:1 sulfuric acid. The supernatant layer, separated in 74% yield, was 3-methylpentanoic acid.

*Example III*

About 76 gms. of isobutyl chloride were passed over a bed of 88 gms. of sodium cyclopentadienyl and the effluent vapors, heated to 350° F. were passed over a bed of a special catalyst. Oxidation to a transient malonic product which immediately decarboxylated occured. The trap contained a fluid which partially dissolved in water. The aluminum soap which precipitated from the aqueous solution on addition to excess alum solution was recovered. On treatment with cold concentrated phosphoric acid, it yielded, as supernatant, 4-methylpentanoic acid:

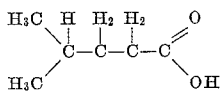

in 30% yield.

(NOTE.—The special catalyst referred to was one designed to facilitate the oxidation of dienes and was obtained by boiling ammonium molybdate and ammonium vanadate together in ammonia containing suspended silica until a sludge formed, the sludge was heated in a stream of air until the ammonium molybdovanadate formed decomposed to give a molecularly dispersed promoted catalyst on the silica body.)

In the alkylated dienes to be oxidized, the alkyl radical may contain from 1–8 carbon atoms and, when more than one alkyl radical is present, the radicals may be the same or different.

The method of isolating the fatty acid described herein is by no means limited to the isolation of acids resulting from the decarboxylation of malonic acid. It is useful for the isolation of the normally soluble monocarboxylic acids contained in crude hydrolysis, oxidation or other products as enumerated herein, and has, in fact, extremely wide application.

The solutions from which the fatty acids are recovered in the form of the aluminum soap may contain the fatty acid in concentrations from at least 5% up to 50% or more. The fatty acids may be mixed with dicarboxylic acid. The latter form readily hydrolyzable salts in the aqueous solution and are not precipitated with the aluminum soap of the monocarboxylic acid. In the case of aqueous solutions ocntaining mixed mono- and di-carboxylic acids only, the monocarboxylic acid may be recovered as the precipitated aluminum soap, the dicarboxylic acid remaining as a substantially pure product dissolved in the water.

Various changes and modifications may be made in practicing the invention, including modifications in the concentration of monocarboxylic acid present in the aqueous solution and variations in the particular aluminum salt used, without departing from the spirit and scope of the disclosure. Therefore, it is to be understood that it is not intended to limit the invention to the specific details and procedures disclosed or to otherwise limit the invention except as defined in the appended claims.

What is claimed is:

1. The method of isolating water-soluble alkyl-substituted acetic acid from aqueous solutions containing the same and produced by hydrolysis of butylcyclopentadiene and in a solution mixed with other water-soluble carboxylic acids, which comprises saponifying the solution, adding the saponified solution to an excess of an aqueous solution of a water-soluble aluminum salt selected from the group consisting of alum and aluminum sulfate to precipitate the insoluble aluminum soap of said alkyl-substituted acetic acid, filtering the resultant acid soaps, and treating the same with cold concentrated phosphoric acid.

2. The method of isolating 3,3-dimethylbutanoic acid from aqueous solutions in which it is produced by hydrolysis of t-butylcyclopentadiene and wherein it is mixed with other water-soluble carboxylic acids, which comprises saponifying the solution containing the acid with aqueous sodium hydroxide, introducing hydrogen sulfide into the resultant solution to precipitate sulfur and manganese sulfide, filtering the solution to separate the precipitate and recover a filtrate containing alkali sulfates and disodium t-butylmalonate, acidifying the filtrate and heating to drive off carbon dioxide, saponifying the solution by the addition of sodium hydroxide and pouring the same into an excess of aluminum sulfate solution to precipitate the aluminum soap of the resultant acid from the solution, filtering to recover the resultant precipitate and drying the same to provide a powdered mass, and admixing said mass with concentrated hydrochloric acid and then separating the resultant 3,3-dimethylbutanoic acid therefrom.

References Cited in the file of this patent

UNITED STATES PATENTS

| | | |
|---|---|---|
| 2,044,968 | Bruson | June 23, 1936 |
| 2,171,198 | Urbain | Apr. 29, 1939 |
| 2,356,340 | Murphree | Aug. 22, 1944 |
| 2,447,064 | Gebhart et al. | Aug. 17, 1948 |
| 2,501,806 | Akers | Mar. 28, 1950 |